(12) United States Patent
Hsieh

(10) Patent No.: US 8,051,308 B2
(45) Date of Patent: *Nov. 1, 2011

(54) DISPLAY DEVICE WITH USB CONNECTIVITY

(75) Inventor: Kuan-Hong Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 323 days.

This patent is subject to a terminal disclaimer.

(21) Appl. No.: 12/241,098

(22) Filed: Sep. 30, 2008

(65) Prior Publication Data

US 2009/0024855 A1  Jan. 22, 2009

Related U.S. Application Data

(63) Continuation of application No. 11/203,340, filed on Aug. 12, 2005, now Pat. No. 7,451,328.

(30) Foreign Application Priority Data

Aug. 13, 2004 (CN) .......................... 2004 1 0051153

(51) Int. Cl.
*G06F 1/00* (2006.01)
*G06F 3/038* (2006.01)
*G06F 1/26* (2006.01)

(52) U.S. Cl. ........ 713/300; 713/320; 713/323; 713/324; 345/211; 345/212

(58) Field of Classification Search .................. 713/300, 713/320, 323, 324; 345/211, 212
See application file for complete search history.

(56) References Cited

U.S. PATENT DOCUMENTS

| | | | | | |
|---|---|---|---|---|---|
| 5,586,333 | A | * | 12/1996 | Choi et al. | 713/320 |
| 5,938,770 | A | * | 8/1999 | Kim | 713/300 |
| 6,049,880 | A | * | 4/2000 | Song | 713/300 |
| 6,105,143 | A | * | 8/2000 | Kim | 713/324 |
| 6,147,682 | A | * | 11/2000 | Kim | 345/211 |
| 6,289,466 | B1 | * | 9/2001 | Bayramoglu et al. | 713/310 |
| 7,451,328 | B2 | * | 11/2008 | Hsieh | 713/300 |
| 2003/0107566 | A1 | | 6/2003 | Shin et al. | |
| 2006/0036885 | A1 | * | 2/2006 | Hsieh | 713/300 |

* cited by examiner

*Primary Examiner* — Brian Misiura
(74) *Attorney, Agent, or Firm* — Altis Law Group, Inc.

(57) ABSTRACT

A method to power an electronic device through an electrical connection port of a display device, includes electrically connecting a display device to a first power source of a host capable of controlling the display device by control signals therefrom, and a second power source independent from the host, the control signals indicating statuses of the host, each of the status comprising a normal mode, a power-saving mode, or a power off mode, and powering the electronic device electrically connected to the display device through the electrical connection port thereof by means of using one of the first and second power sources based on the control signals transmittable from the host to the display device.

5 Claims, 2 Drawing Sheets

DISPLAY DEVICE WITH USB CONNECTIVITY

CROSS-REFERENCE TO RELATED APPLICATION

This application is a continuation of U.S. patent application Ser. No. 11/203,340, filed on Aug. 12, 2005, now U.S. Pat. No. 7,451,328, issued on Nov. 11, 2008.

BACKGROUND OF THE INVENTION

1. Field of the Invention

The present invention relates to display devices, and particularly to a display device with built-in USB (Universal Serial Bus) ports.

2. Description of the Related Art

Most computers are now configured with USB ports; the USB ports allow the computers to communicate with external USB devices.

The power pins of the USB ports provide approximately +5V voltage. Recently, computers have been used to power or even charge external devices by utilizing the USB ports. The power supplied to an external device is typically obtained from internal components of the host computer. For example, a USB port, built into a display device of a computer, can supply power to or charge a connected USB device. However, the power supplied to the external device is practicable only when the host computer is in a normal working mode. Once the host enters into a power-saving mode or is powered off, the power supply to the external device is immediately cut off.

However, most display devices have their own power supply independent from the host computer. As such, these display devices have the potential ability to power external devices.

Therefore, there is a need for a display device with a USB port, whereby when a corresponding host computer is in a power-saving or power off mode, the display device can power or charge any connected USB devices.

SUMMARY OF THE INVENTION

To solve the above-mentioned and other problems, a display device with USB connectivity (hereinafter "the display device) is provided. The display device includes a power module and one or more USB ports. The power module has batteries embedded therein as a power source or is connected to an external power source to obtain power therefrom. The USB ports have power pins through which the power module powers or even charge external USB devices. The display device further includes a switching circuit which positioned between the power module and the USB ports, to establish or cut off a connection between the power module and the USB ports, and a controller which controls the switching circuit to be on or be off, to establish or cut off the connection between the power module and the USB ports accordingly. The controller may be a display device which controls the switching circuit in accordance with a current status of a host, or a button, which controls the switching circuit in accordance with manual operations of a user.

Further, a computer system which includes a display device with USB connectivity is also provided. The computer system further includes a host. The host has a plurality of statuses, including a normal mode, a plurality of power-saving modes and a power off mode. The display device includes a power module, a display controller, a switching circuit, an OR gate circuit, and one or more USB ports. The USB ports have power pins, which selectively couple the power module or the host to external USB devices to power or charge the USB devices. The OR gate circuit selectively couples the power pins with the power module or with the host. The display device detects what status the host stands, and controls the switching circuit on or off to establish or cut off a connection between the power module and the USB ports, in accordance with the status of the host.

One of the advantages of the present invention is, in spite of what status the host may be in, whether a normal mode, a power-saving mode or a power off mode, after being connected to the display device via the USB ports of the display device, external USB devices are able to obtain power from the host or from the display device.

Other advantages and novel features will become more apparent from the following detailed description when taken in conjunction with the accompanying drawings.

DETAILED DESCRIPTION OF THE PREFERRED EMBODIMENTS

Figure 1:
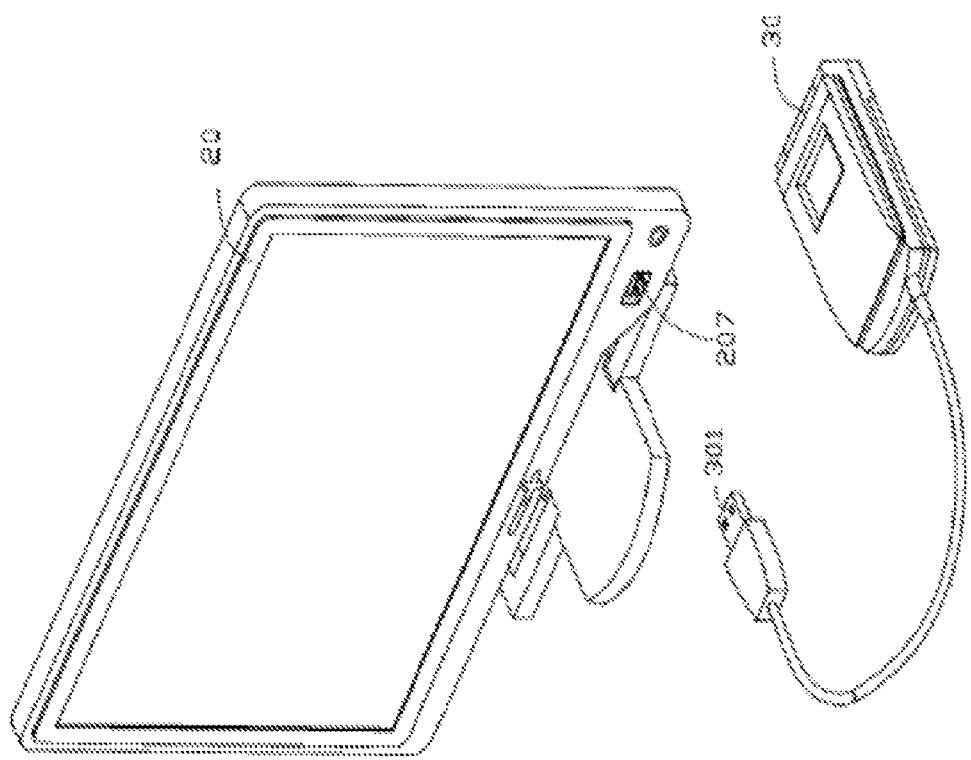
FIG. 1 is an isometric view of a display device with at least one built-in USB port, in accordance with the preferred embodiment of the present invention, together with a USB device which can interconnect with the display device via the USB port.

FIG. 1 is an isometric view showing a display device with one or more built-in USB ports (hereinafter "the display device") in accordance with a preferred embodiment of the present invention, together with a USB device which can connect with the display device via any one of the USB ports. The display device 20 may be a CRT (cathode ray tube), an LCD (liquid crystal display), or any other type of display apparatus known in the art. The USB ports 207 (only one is shown in FIG. 1) may be positioned in any suitable part of the display device 20, such as on a front panel or a rear panel of the display device 20. Appropriate positioning facilitates users in connecting the USB device 30 with the display device 20. In FIG. 1, an exemplary USB device 30 is shown as being a mobile phone.

The USB devices 30 may be coupled to the display device 20 directly, or via an intermediate apparatus. For example, the coupling may be via a hub which can expand the number of USB devices 30 to be connected to the display device 20 when needed, or via charging cables. The USB devices 30 are not to be construed as being limited to mobile phones, as illustrated in FIG. 1. On the contrary, the USB devices 30 may include all manner of various suitable electronic devices. Such electronic devices have one or more USB plugs 301, or are configured with charging cables or chargers that have a USB plug 301. Examples include mobile phones, MP3 (MPEG, audio layer 3) players, notebooks, PDAs (Personal Digital Assistants), and so on.

The USB devices 30 may be equipped with one or more embedded secondary batteries if needed. When equipped with embedded secondary batteries, and connected with the display device 20, the USB devices 30 not only obtain power from the display device 20, but also synchronously charge the embedded secondary batteries via charging circuits thereof. Generally, a standard USB port 207 provides (5±5%)V voltage and 100~500 mA current, which are sufficient to power and charge most USB devices 30 and their embedded secondary batteries. Otherwise, an additional adaptor is needed to adjust the voltage and current obtained from the USB port 207, in order to obtain a particular power level that is required by some specific USB devices 30.

Figure 2:
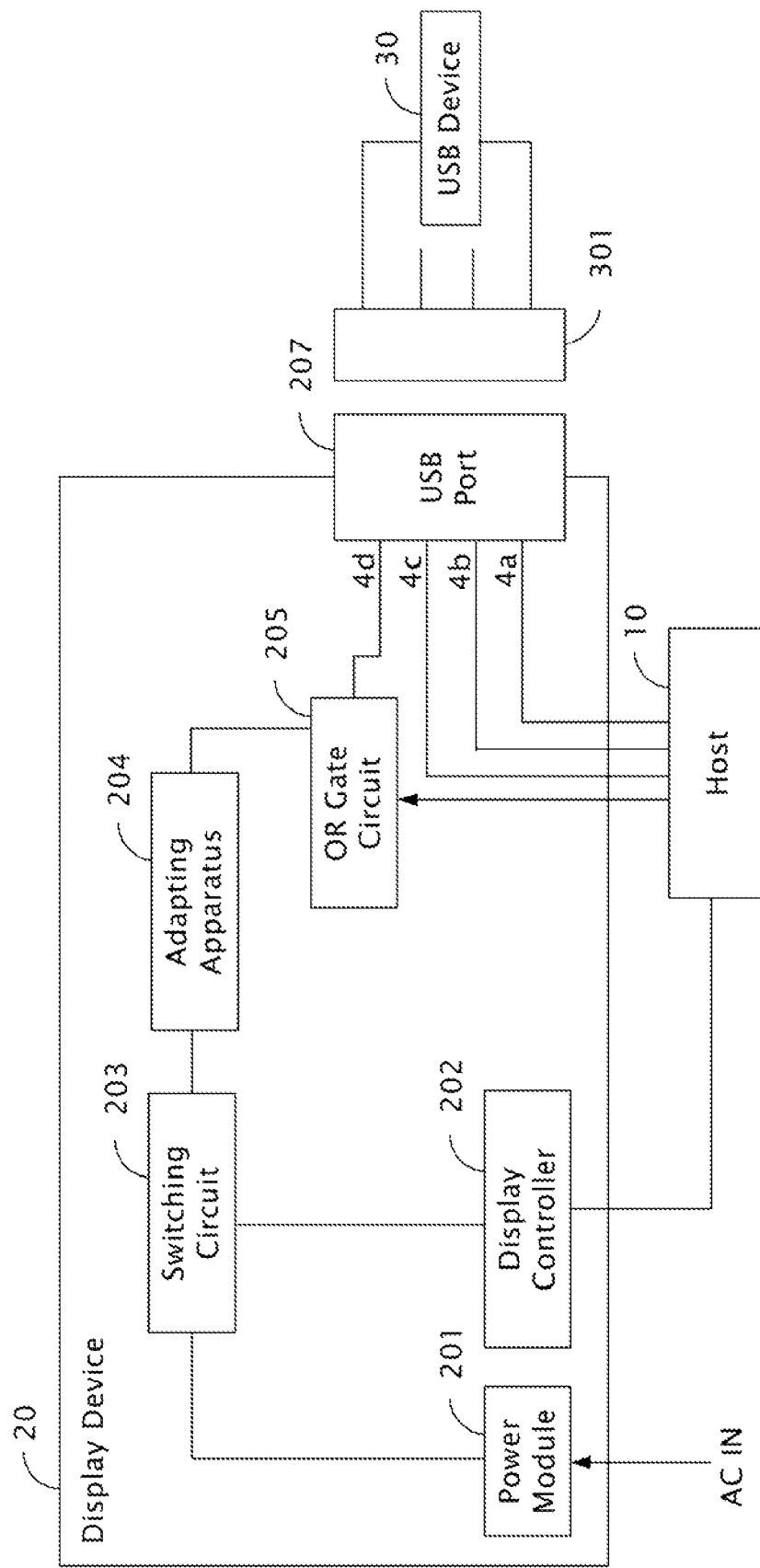
FIG. 2 is a circuit diagram showing how the display device with the built-in USB port of FIG. 1 powers the USB device via the USB port, in accordance with the preferred embodiment of the present invention.

FIG. 2 is a circuit diagram showing how the display device 20 powers a USB device 30 via a USB port 207, in accordance with the preferred embodiment of the present invention. The display device 20 interconnects with a host 10, which together constitute a computer system 1. The display device 20 includes at least one power module 201, a display controller 202, a switching circuit 203, an adapting apparatus 204, an OR gate circuit 205, and the USB port 207. The power module 201 powers all components of the display device 20. Further, when necessary, the power module 201 can power the USB device 30 in addition to powering the components of the display device 20. The power module 201 can supply the power from an intrinsic power source, (i.e., embedded batteries,) or from an external power source.

The switching circuit 203 is series-connected between the power module 201 and the adapting apparatus 204. The switching circuit 203 has two input terminals and one output terminal. The input terminals are respectively connected to the power module 201 and the display controller 202, and the output terminal is connected to the adapting apparatus 204. The display controller 202 is connected to the host 10, and receives video signals from the host 10 via a video interface (not shown). The video interface can, for example, be a VGA (video graphics array) interface or a DVI (display visual interface) interface. Based on the state of video signals it receives, the display controller 202 determines what status the host stands in, and controls the switching circuit 203 on or off accordingly. Typically, the status can be a normal mode, a power-saving mode, or a power off mode. In the preferred embodiments, when the host 10 is detected to be in a power off mode or a power-saving mode, the display controller 202 controls the switching circuit 203 to be on, whereupon the power module 201 supplies power to the adapting apparatus 204 via the switch circuit 203. When the host 10 is detected to be in a normal mode, that is, the host 10 is in a normal working status, the display controller 202 controls the switch circuit 203 to be off, so as to stop the supply of power from the power module 201 to the adapting apparatus 204. The switching circuit 203 may include one or more transistors, or any other suitable switches that can switch on and off under the control of the display controller 202, whereby the supply of power from the power module 201 to the adapting apparatus 204 is either passed or blocked.

The adapting apparatus 204 is coupled to the USB port 207 via the OR gate circuit 205. The OR gate circuit 205 has two input terminals and one output terminal. The input terminals are respectively connected with the adapting apparatus 204 and the host 10. The output terminal is connected with a power pin (designated as 4d in FIG. 2) of the USB port 207. With such a connection, the OR gate circuit 205 selectively couples the adapting apparatus 204 or the host 10 to the USB port 207. Accordingly, the source of power for the USB device 30 is either the power module 201 or the host 10. In the preferred embodiment, if the host 10 is powered off or in a power-saving mode, the display controller 202 controls the switching circuit 203 to conduct current. Then a first power path is established, which includes the power module 201, the switching circuit 203, the adapting apparatus 204, the OR gate circuit 205 and the USB port 207. If the host 10 is in a normal mode, the display controller 202 controls the switching circuit 203 to cut off. Thus the first power path is correspondingly cut off. Then a second power path is established, which includes the host 10 and the USB port 207 adopted to transmit power to the USB device 30. In the preferred embodiment, all of pins 4a, 4b, 4c (i.e., excluding the power pin 4d) of the USB port 207 are directly coupled to the host 10. These other pins, including one ground pin (designated as 4a) and two data pins (designated as 4b, and 4c), are directly coupled to the host 10. Thus the USB device 30 is able to exchange data with the host 10 when receiving power from the host 10.

The OR gate circuit 205 may include two parallel-connected diodes or transistors or any other suitable elements, such as a chip with a firmware program, which implement the function of selectively coupling the adapting apparatus 204 or the host 10 to the USB port 207. The adapting apparatus 204 includes a transformer (not shown), and converts the voltage and current from the power module 201 to match the USB port 207. Furthermore, the adapting apparatus 204 may also include a current-limiting apparatus to limit the current output, and a short-circuit protection circuit to protect the display device 20. In addition, instead of being placed between the switching circuit 203 and the OR gate circuit 205, in other embodiments, the adapting apparatus 204 may be positioned between the OR gate circuit 205 and the USB port 207, or in any other suitable place.

The display controller 202 controls the switching circuit 203 on or off in accordance with the current status of the host 10. In the preferred embodiment, the statuses of the host are defined pursuant to ACPI (Advanced Configuration and Power Interface) specifications, which were co-developed by Hewlett-Packard (HP®), Intel (Intel®), Microsoft (Microsoft®), Phoenix (Phoenix®), and Toshiba (Toshiba®). The display controller 202 detects what status the host 10 stands in. If the host 10 is in any one of the power-saving modes, or in a power off mode, the display controller 202 controls the switching circuit 203 to be on. Meanwhile, the OR gate circuit 205 electrically couples the adapting apparatus to the USB port 207. The first power path conducts, and the USB device 30 is powered or even charged by the power module 201. If the host 10 is in a normal mode, the display controller 202 controls the switching circuit 203 to be off. Accordingly, the OR gate circuit 205 electrically couples the host 10 to the USB port 207. The second power path conducts, and the USB device 30 is powered or even charged by the host 10.

The above description illustrates that the switching circuit 203 is controlled by the display controller 202. However, in another embodiment, the switching circuit 203 can be manually controlled by a user via a button (not shown) installed on the display device 20. The button electrically controls the switching circuit 203 according to known technology. This gives the user the discretion to select the display device 20 as a power source of the USB device 30, even if the host 10 is in a normal mode.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of type and arrangement of components within the principles of the invention to the full extent indicated by general meaning of the terms in which the appended claims are expressed.

What is claimed is:

1. A method to power an electronic device through an electrical connection port of a display device, comprising the steps of:

electrically connecting a display device to a first power source of a host capable of controlling said display device by control signals therefrom, and a second power source independent from said host, the control signals indicating statuses of the host, each of the status comprising a normal mode, a power-saving mode, or a power off mode;

powering the electronic device electrically connected to said display device through the electrical connection port thereof using said first power source if said control signals indicating that said host is in the normal mode; and powering the electronic device electrically connected to said display device through the electrical connection port thereof using said second power source if said control signals indicating that said host is in the power-saving mode or in the power off mode.

2. The method according to claim 1, wherein the electrical connection port of the display device is a Universal Serial Bus (USB) port, and at least one switching circuit in response to said control signals is used to select one of said first and second power sources in said powering step.

3. The method according to claim 1, wherein the second power source is a power module of the display device.

4. The method according to claim 1, wherein the control signals are video signals from the host.

5. The method according to claim 4, wherein a state of the video signals indicates which of the statuses the host stands.

\* \* \* \* \*